United States Patent Office 3,316,715
Patented May 2, 1967

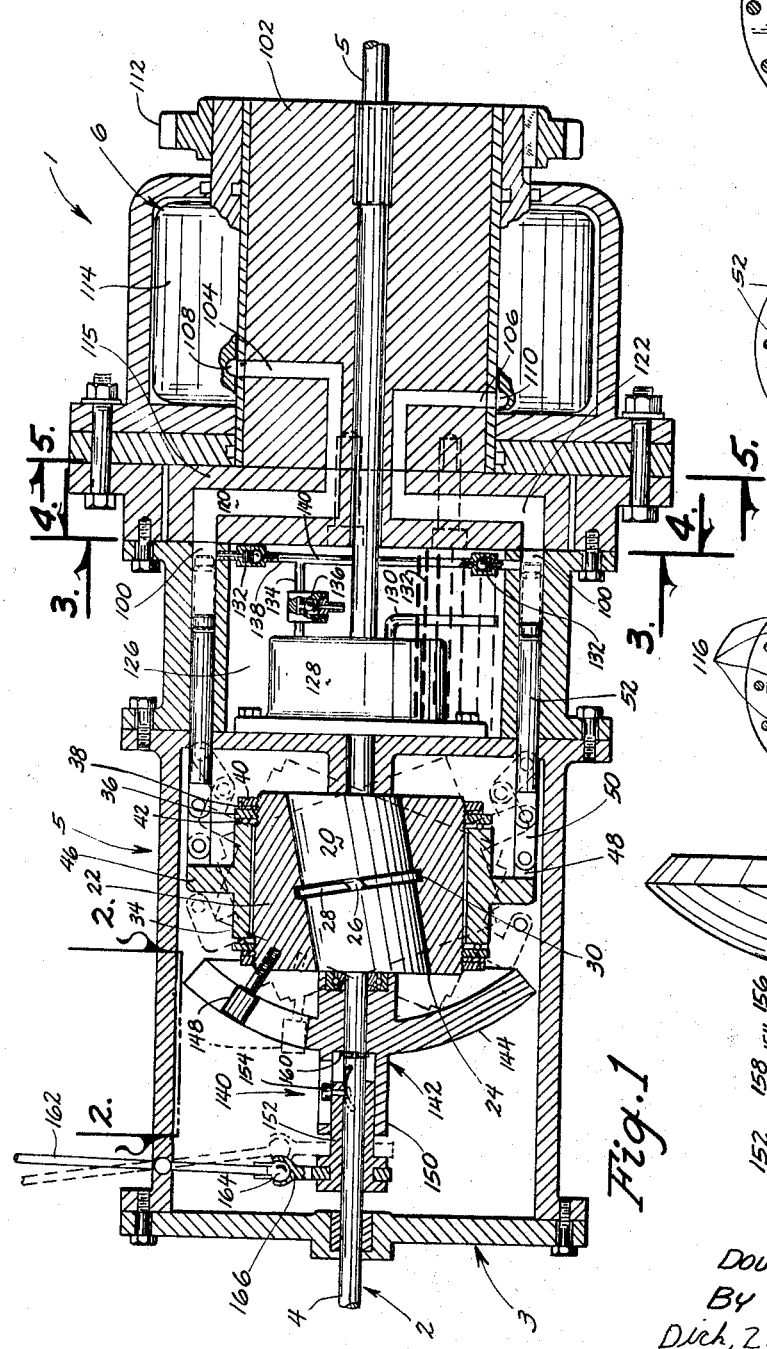

3,316,715
VARIABLE SPEED TRANSMISSION
Douglas F. McFarland, Davis City, Iowa. 50065
Filed May 11, 1966, Ser. No. 549,231
12 Claims. (Cl. 60—53)

This is a continuation-in-part application of co-pending application Ser. No. 483,748 filed Aug. 30, 1965 and entitled, Variable Speed Transmission.

This invention relates to power transmissions and in particular to variable speed transmissions.

Farm tractors, for example, with conventional transmissions require shifting of gears to prevent overloading or underloading of the engine. The shifting of gears, ordinarily require stopping the vehicle to prevent damaging the transmission.

It is one of the principal objects of this invention to provide a variable speed transmission which may be continuously adjusted to provide a wide range of output speeds as desired or as the load on the transmission varies and thereby provide a smooth transmission of power through the transmission.

Another object of this invention is to provide a variable speed transmission having an output drive means coupled to the input drive shaft through a hydraulic motor and designed to operate at a 1:1 ratio; however, should it be desired to reduce the output speed, hydraulic fluid may be metered from the hydraulic motor and used as a regenerative power means for driving the input drive shaft. Upon sufficient fluid being metered from the hydraulic motor the output drive member of the hydraulic motor may be slowed to zero revolutions per minute and by further metering of fluid the motor may be caused to turn in the opposite direction and thus give the transmission a reverse drive.

A further related object of this invention is to provide a variable speed transmission wherein input power is supplied to an output drive through a hydraulic motor having one member of the hydraulic motor connected directly to the input drive shaft of the transmission and an adjustable wobble plate assembly is connected to the drive shaft of the transmission with a plurality of pistons adapted to be in communication with the inlet and outlet ports of the hydraulic motor whereupon when the wobble plate assembly is being driven by the input shaft at times it may function to cause the hydraulic motor output drive to exceed the speed of the transmission drive shaft and thereby provide an overdrive for the transmission.

Another related object of this invention is to provide a variable speed transmission having a drive shaft to which a wobble plate assembly is connected and one member of a hydraulic motor through which output power is transmitted; a rotating manifold member is connected to the drive shaft for alternately placing the inlet and outlet sides of the hydraulic motor in communication with pistons 180 degrees apart which are connected to the wobble plate assembly such that on the compression stroke of each of the pistons the fluid is directed into the inlet of the hydraulic motor and on the expansion stroke the pistons are in communication with the outlet port of the hydraulic motor through the rotating manifold. Any desired even number of pistons may be provided for communication through an even number of openings in the rotating manifold. The operation of the wobble plate assembly with the reciprocation of the pistons is positively synchronized with the rotating manifold since each are keyed to a common drive shaft which also is connected to one member of a hydraulic motor.

Yet another object of this invention is to provide a variable speed transmission having a wobble plate assembly wherein a pair of sleeves are rotatably and telescopically mounted on the drive shaft and a control lever is provided for selectively moving the sleeves longitudinally relative to each other and in turn rotating the wobble plate members relative to each other to vary the wobble of the wobble plate assembly and consequently the stroke of the pistons connected thereto; the pistons operating through a complete cycle for each revolution of the rotating manifold regardless of the length of stroke for the pistons.

A further object of this invention is to provide a variable speed transmission which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a longitudinal cross-sectional view of the transmission;

FIG. 2 is a fragmentary view taken along line 2—2 in FIG. 1;

FIG. 3 is a cross-sectional view of the rotating manifold taken along line 3—3 in FIG. 1;

FIG. 4 is a cross-sectional view taken along line 4—4 in FIG. 1 and illustrating the location of the pistons; and FIG. 5 is a cross-sectional view taken along line 5—5 in FIG. 1.

The variable speed transmission of this invention is generally referred to in FIG. 1 by the reference numeral 1 and includes a drive shaft 2 extending the full length of a transmission housing 3. The drive shaft 2 is provided with an input end 4 and an output end 5. On the input end 4 of the drive shaft 2, a wobble plate assembly 5 is mounted while output power is transmitted through a hydraulic motor 6 mounted on the output end 5 of the drive shaft 4.

As seen in FIG. 1, a first cylindrical member 20 is integrally mounted on the input drive shaft 4 and is disposed with its center longitudinal axis extending at an angle to the longitudinal axis of the drive shaft. Matingly embracing the inner cylindrical member 20 is an outer cylindrical member 22 which has a cylindrical opening 24 extending therethrough with its longitudinal axis extending at an angle to the center longitudinal axis of the cylindrical member 22. An annular recess 26 is formed centrally in the inner cylindrical member 20 to receive a snap lock ring 28 which is also received in an annular recess 30 formed in the inner wall of the cylindrical member 22 and thereby limits relative longitudinal movement between the two cylindrical members 20 and 22. Rotational movement of these members 20 and 22 is however permitted.

A collar member 34 is stationary within the housing 3 and embraces the outer cylindrical member 22 whereby the two cylindrical members 20 and 22 rotate therein on the shaft 4. Each end of the outer cylindrical member 22 is threaded to receive a bearing plate 36, a lock washer 38 and a nut 40. A plurality of ball bearings 42 are disposed in hemispherical recesses formed in facing faces on the bearing plates 36 and the outer annular edges of the collar member 34. Accordingly, the collar member 34 is limited against relative longitudinal movement on the cylindrical members 20 and 22 and also the shaft 4 although rotational movement of the cylindrical members 20 and 22 is permitted relative to the collar member 34.

An annular shoulder 46 is integrally formed on the exterior of the collar member 34 intermediate its longitudinal length and is provided with at least one pair of ears 48 which are connected to a link element 50 in turn connected to a power output slidable rod piston 52 which extends through a cylinder 100. As seen in FIG. 4, eight pistons 52 are equally spaced in a circular pattern inside the housing 3 and are connected to the collar 34.

In the hydraulic motor 6, a rotor member 102 is keyed to the output end 5 of the drive shaft 2. An inlet passageway 104 and an outlet passageway 106 communicate with spaced apart annular grooves 108 and 110 respectively in the hydraulic motor 6. An output drive sprocket 112 is connected to an outer member 114 of the hydraulic motor 6 and thus upon rotation of the outer member 114 the drive sprocket 112 will be rotated. A rotating manifold 115 is bolted to the inner member 102 of the hydraulic motor and provides for the extension of the passageways 104 and 106. Arcuate equally spaced apart inlet elongated openings 116 are provided in the rotating manifold 115 along with similar outlet openings 118 which are adapted to register with the cylinders 100 in which the pistons 52 are mounted. Each of the inlet openings 116 communicate through passageways 120 with the common inlet passageway 104 while the outlet openings 118 communicate through individual passageways 122 with the outlet passageway 106.

A reservoir chamber 126 is provided between the rotating manifold 115 and the wobble plate assembly 5 and has mounted therein a pump 128 which is driven by the drive shaft 2. An inlet conduit 130 is disposed in the hydraulic fluid 132. An outlet conduit 134 is connected to the pump 128 through a by-pass valve 136. A separate conduit such as 138 or 140 is provided for communication with the cylinders 100 shown in FIG. 1. A check valve 132 is provided in the conduits 138 and 140 to permit hydraulic fluid to only leave the reservoir 126 in the event that there is a shortage in the hydraulic motor 6 and its connecting passageways 104 and 106.

The wobble plate assembly 5 is provided with a control assembly 140 which includes a sleeve member 142 mounted on the input end for the drive shaft 2 and having a hemispherical portion 144 facing the wobble plate assembly 5. A radial slot 146 is formed in the hemispherical portion 144 and receives a roller 148 mounted on the end of a pin 150 which is connected to the wobble plate member 22. When the wobble plate assembly 5 is in its neutral or inoperative position, it assumes the position shown by the solid lines in FIG. 1 and when it is moved to its extreme wobble positions it assumes the dash line position in this figure. Extending outwardly of the hemispherical portion 144 is a sleeve portion 150 which telescopingly receives a second sleeve member 152 rotatably mounted on the input end 4 of the drive shaft 2. A pin 154 is carried by the sleeve 152 and has a outer portion positioned in a helical slot 156 formed in the sleeve portion 150 on the first sleeve member 142. The inner end of the pin 154 is received in a helical slot 158 formed in the peripheral surface of the inner end for the shaft 2 and extending in the opposite direction of the helical slot 156. A snap ring 160 secured to the shaft 2 holds the first sleeve member 142 against relative longitudinal movement of the shaft 2.

A control arm 162 is pivotally connected to the housing 3 and has an inner end 164 pivotally connected to a bearing member 166 which embraces the second sleeve member 152. Thus it is seen that by operation of the control member 162 the sleeve members 142 and 152 may be moved longitudinally relative to each other and thereby rotate the wobble plate members 20 and 22 relative to each other to a position between the solid line and the dash line positions of FIG. 1.

In operation it is seen that when the wobble plate assembly 5 is in its neutral solid line position of FIG. 1, the pistons 52 will be inoperative and the hydraulic fluid in the hydraulic motor 6 will be at rest thereby providing a 1:1 ratio between the output drive shaft end 5 and the output sprocket member 112. However, when the load on the output sprocket 112 is substantially increased, fluid from the hydraulic motor 6 may be metered therefrom by adjusting the wobble plate assembly to a position where the pistons 52 will be operated. Thus fluid will be discharged from the hydraulic motor 6 through the outlet passageway 122 to the piston cylinders 100 when the pistons 52 are in their expansion or retraction strokes and conversely the fluid will be pumped through the inlet passageway 120 by the pistons when they are moving through their compression strokes. It is important to note that when the pistons are in their compression strokes their cylinders are in registry with the inlet openings 116 and when they are in their expansion strokes the cylinders are in registry with the outlet openings 118 in the rotating manifold 115 and consequently fluid is directed to the inlet and outlet sides of the motor respectively. As the wobble plate assembly is further adjusted toward the dash line position, the output power of the hydraulic motor 6 may be reduced to zero and consequently the output sprocket 12 will be stopped. The transmission may be designed such that when it is fully adjusted for maximum wobble the pressures in the hydraulic motor will be increased to the point that the outer member 6 will begin to rotate in the opposite direction such that the transmission will be providing power for operation in reverse through the sprocket 112. When operating in reverse, the cubic inch displacement of the cylinders 100 will be larger than that of the hydraulic motor 6.

An overdrive is provided through the use of this transmission. This is accomplished, by adjusting the control lever 162 in the opposite direction such that the piston cylinders 100 are now in communication with the outlet openings 118 of the rotating manifold 115 when the pistons 52 are on their compression strokes and conversely the cylinders are in communication with the inlet openings 116 when the pistons are on their expansion strokes. The hydraulic motor now will be assisted by the wobble plate assembly and conversely the output sprocket 112 can be rotated at a higher speed than is normally possible. It is to be particularly noted that the rotating manifold 115 is always maintained in synchronization with the wobble plate assembly 5 since for each complete cycle of reciprocal movement of the pistons 52 regardless of the length of stroke, the rotating manifold rotates one complete revolution as it is connected to the drive shaft 2 through the inner member 102 of the hydraulic motor 6.

It is seen that when the load on the output sprocket 112 would normally tend to kill the engine driving the transmission, the control lever 162 may be adjusted to permit the output sprocket 112 to rotate at a slower speed but yet retain the energy in the fluid being metered from the motor 6 by directing it back to the drive shaft 2 through the wobble plate assembly 5. Thus regenerative power is made possible through the use of this transmission.

Some changes may be made in the construction and arrangement of my variable speed transmission without departing from the real spirit and purpose of my invention, and it is my intention to cover by my claims, any modified forms of structure or use of mechanical equivalents which may be reasonably included within their scope.

I claim:

1. A transmission having a drive shaft with input and output ends,
 a hydraulic motor having input and output openings, and input and output drive members, said input drive member being connected to and driven by said output end of said shaft,
 a pair of reciprocating power pistons,
 means limiting rotational movement of said pistons about the axis of rotation of said shaft, adjustable means for connecting said pistons to said input end of said drive shaft for reciprocating said pistons, said pistons being 180 degrees out of phase with each other when being operated, and a manifold mounted on and rotatable with said output end of said drive shaft, said manifold having inlet and outlet openings adapted to alternately communicate with said power pistons, and said inlet and outlet openings being in communication with said input and output openings respectively of said motor.

2. The structure of claim 1 wherein the output drive member of said hydraulic motor is adapted to rotate as a unit with said drive shaft when said pair of pistons are stationary.

3. The structure of claim 1 and an even number of pistons are disposed concentrically around said drive shaft, and said manifold has an equal number of inlet and outlet openings adapted to alternately communicate with said plurality of pistons.

4. The structure of claim 1 and a reservoir is provided in communication with said pistons through check valves, said check valves being arranged for said pistons to communicate with said reservoir only during an expansion stroke.

5. The structure of claim 1 wherein said inlet and outlet openings in said manifold are elongated and arcuate in shape and disposed 180 degrees apart.

6. The structure of claim 1 and said adjustable means for connecting said pistons to said drive shaft includes means for continuously maintaining the operation of said pistons synchronized with the rotation of said manifold.

7. The structure of claim 1 wherein said adjustable means for connecting said pistons to said input end of said drive shaft include, an elongated cylindrical member mounted on said shaft and having a longitudinal center axis extending at an angle to the center longitudinal axis of said shaft, a second elongated cylindrical member rotatably mounted on said first cylindrical member, said second cylindrical member having an opening for matingly receiving said first cylindrical member, said opening having a center longitudinal axis disposed at an angle to the center longitudinal axis of said second member, and control means for interconnecting and selectively rotating said first and second cylindrical members relative to each other to one position of adjustment wherein the outer peripheral surface of said second cylindrical member has a uniform radius of curvature about the center longitudinal axis of said shaft and to other positions wherein said radius of curvature varies along the length of said outer surface of said second member whereby in said latter positions points on the outer surface of said second member move back and forth along the longitudinal axis of said shaft as said shaft is rotated, and output drive means interconnecting said second member and said pistons.

8. The structure of claim 7 wherein said output drive means is connected to said second member through a collar member, said collar member being mounted on said second member, said drive means limiting rotation of said collar member relative to the longitudinal axis of said shaft.

9. The structure of claim 7 and said control means includes a pair of telescopingly interengaged sleeves mounted on said input end of said drive shaft, one of said sleeves being rotatable with said shaft and the other sleeve being rotatable with said second member, means interconnecting said pair of sleeves for relative rotation between said sleeves upon said sleeves being moved longitudinally relative to each other.

10. The structure of claim 9 and said control means includes a control arm having a bearing mounted thereon, said one sleeve being rotatably mounted in said bearing, said control arm adapted to longitudinally move said one sleeve while said one sleeve is rotating with said shaft.

11. The structure of claim 1 wherein upon the cubic inch displacement of said pistons exceeding that of the hydraulic motor, said output drive member of said hydraulic motor will be caused to rotate in the opposite direction.

12. A transmission having a drive shaft with input and output ends, a hydraulic motor having input and output openings, and input and output drive members, said input drive member being connected to and driven by said output end of said shaft, a pump assembly having inlet and outlet ports, adjustable means for connecting said pump assembly to said input end of said drive shaft, said adjustable means being stationary relative to rotational movement about the axis of rotation of said drive shaft, means directly synchronizing said adjustable means with said input and output ends of said drive shaft, and a manifold mounted on and rotatable with said output end of said drive shaft, said manifold having inlet and outlet openings adapted to alternately communicate with said pump inlet and outlet ports, and said manifold inlet and outlet openings being in communication with said input and output openings respectively of said hydraulic motor.

References Cited by the Examiner

UNITED STATES PATENTS

| | | | |
|---|---|---|---|
| 1,840,872 | 1/1932 | Rayburn | 60—53 |
| 2,874,533 | 2/1959 | Schott | 60—53 X |
| 3,196,616 | 7/1965 | Date et al. | 60—53 |

EDGAR W. GEOGHEGAN, *Primary Examiner.*